(12) United States Patent
Tamai

(10) Patent No.: US 11,502,375 B2
(45) Date of Patent: Nov. 15, 2022

(54) SEPARATOR FOR NONAQUEOUS ELECTROLYTE SECONDARY BATTERIES AND NONAQUEOUS ELECTROLYTE SECONDARY BATTERY

(71) Applicant: SANYO Electric Co., Ltd., Daito (JP)

(72) Inventor: Hidekazu Tamai, Kyoto (JP)

(73) Assignee: SANYO Electric Co., Ltd., Daito (JP)

( * ) Notice: Subject to any disclaimer, the term of this patent is extended or adjusted under 35 U.S.C. 154(b) by 0 days.

(21) Appl. No.: 16/141,130

(22) Filed: Sep. 25, 2018

(65) Prior Publication Data

US 2019/0097200 A1 Mar. 28, 2019

(30) Foreign Application Priority Data

Sep. 28, 2017 (JP) .............................. JP2017-188282

(51) Int. Cl.
*H01M 50/449* (2021.01)
*H01M 10/058* (2010.01)
*H01M 10/42* (2006.01)
*H01M 50/411* (2021.01)
*H01M 10/0525* (2010.01)

(52) U.S. Cl.
CPC ....... *H01M 50/449* (2021.01); *H01M 10/058* (2013.01); *H01M 10/4235* (2013.01); *H01M 50/411* (2021.01); *H01M 10/0525* (2013.01)

(58) Field of Classification Search
CPC ............. H01M 2/1686; H01M 2/1653; H01M 10/4235; H01M 10/058; H01M 10/0525; H01M 50/449; H01M 50/411
See application file for complete search history.

(56) References Cited

U.S. PATENT DOCUMENTS

| 5,824,430 A | 10/1998 | Higuchi et al. |
| 2005/0058896 A1* | 3/2005 | Nomura ............... H01M 2/1673 429/142 |
| 2009/0117453 A1 | 5/2009 | Kikuchi et al. |

(Continued)

FOREIGN PATENT DOCUMENTS

| JP | 3939778 B2 | 7/2007 |
| JP | 2008-255306 A | 10/2008 |

(Continued)

OTHER PUBLICATIONS

English Translation of Chinese Office Action dated Jan. 19, 2022, issued in counterpart CN application No. 201811104117.9. (5 pages).

(Continued)

*Primary Examiner* — Stephen J Yanchuk
(74) *Attorney, Agent, or Firm* — WHDA, LLP

(57) ABSTRACT

A nonaqueous electrolyte secondary battery includes an electrode assembly including a positive electrode, a negative electrode, and a separator and a nonaqueous electrolyte. The separator includes a porous resin sheet having at least a three-layer structure consisting of an A-layer, a B-layer, and a C-layer stacked in that order. The average thermal expansion coefficient of each of the A-layer and the C-layer at a temperature of 0° C. to 50° C. is 100 ppm/K or more less than the average thermal expansion coefficient of the B-layer at a temperature of 0° C. to 50° C.

6 Claims, 4 Drawing Sheets

(56) References Cited

U.S. PATENT DOCUMENTS

| | | | |
|---|---|---|---|
| 2011/0159340 A1* | 6/2011 | Hu | H01M 2/1077 |
| | | | 429/120 |
| 2015/0200387 A1* | 7/2015 | Nishikawa | H01M 2/1686 |
| | | | 429/144 |
| 2016/0043371 A1* | 2/2016 | Yamada | H01M 2/166 |
| | | | 429/144 |
| 2018/0076434 A1 | 3/2018 | Murakami et al. | |
| 2019/0016871 A1* | 1/2019 | Bao | H01M 4/666 |
| 2019/0123324 A1* | 4/2019 | Dushatinski | H01M 2/162 |
| 2019/0334149 A1* | 10/2019 | Li | H01M 2/1686 |

FOREIGN PATENT DOCUMENTS

| | | |
|---|---|---|
| JP | 5202866 B2 | 6/2013 |
| KR | 10-1775313 B1 | 9/2017 |

OTHER PUBLICATIONS

English Translation of Chinese Office Action dated Jul. 28, 2022, issued in counterpart CN application No. 201811104117.9. (4 pages).

\* cited by examiner

SEPARATOR FOR NONAQUEOUS ELECTROLYTE SECONDARY BATTERIES AND NONAQUEOUS ELECTROLYTE SECONDARY BATTERY

CROSS REFERENCE TO RELATED APPLICATIONS

The present invention application claims priority to Japanese Patent Application No. 2017-188282 filed in the Japan Patent Office on Sep. 28, 2017, the entire contents of which are incorporated herein by reference.

BACKGROUND OF THE INVENTION

Field of the Invention

The present disclosure relates to a separator for nonaqueous electrolyte secondary batteries and a nonaqueous electrolyte secondary battery.

Description of Related Art

Separators which are porous resin sheets having ionic permeability and insulating properties are used in electrode assemblies for nonaqueous electrolyte secondary batteries such as lithium ion batteries. For example, Japanese Patent No. 3939778 (Patent Document 1) discloses a separator which is composed of a porous multilayer film including a porous polypropylene layer formed from polypropylene with a weight-average molecular weight of 660,000 to 980,000 and a porous layer containing a material with a melting point ranging from 100° C. to 140° C. and which has a needle penetration strength of 470 gf to 510 gf. Japanese Patent No. 5202866 (Patent Document 2) discloses a separator which is a polyolefin multilayer microporous membrane including first porous layers forming two surface layers and a second porous layer placed between the surface layers.

The first porous layers are made of ultra-high molecular weight polyethylene and the second porous layer is made of ultra-high molecular weight polyethylene and high-density polyethylene.

BRIEF SUMMARY OF THE INVENTION

Nonaqueous electrolyte secondary batteries are required to have further increased capacity and power. For a separator which is one of members of a secondary battery, a reduction in thickness for achieving high capacity and an increase in porosity for achieving high capacity are trends. It is an issue to ensure the strength of the separator. In the case where, for example, an electrode assembly is contaminated with a conductive contaminant, the conductive contaminant may possibly penetrate the separator to cause an internal short circuit when the separator has low strength.

A separator for nonaqueous electrolyte secondary batteries according to an aspect of the present disclosure includes a porous resin sheet having at least a three-layer structure consisting of an A-layer, a B-layer, and a C-layer stacked in that order. The average thermal expansion coefficient of the A-layer at a temperature of 0° C. to 50° C. is 100 ppm/K or more less than the average thermal expansion coefficient of the B-layer at a temperature of 0° C. to 50° C. The average thermal expansion coefficient of the C-layer at a temperature of 0° C. to 50° C. is 100 ppm/K or more less than the average thermal expansion coefficient of the B-layer at a temperature of 0° C. to 50° C.

A nonaqueous electrolyte secondary battery according to an aspect of the present disclosure includes an electrode assembly including a positive electrode, a negative electrode, and the separator and a nonaqueous electrolyte.

According to are aspect of the present disclosure, a separator, having high puncture strength, for nonaqueous electrolyte secondary batteries can be provided, the separator being capable of achieving a reduction in thickness and an increase in porosity. A nonaqueous electrolyte secondary battery according to an aspect of the present disclosure includes the separator. In the nonaqueous electrolyte secondary battery, even if an electrode assembly is contaminated with, for example, a conductive contaminant, the contaminant is sufficiently inhibited from penetrating the separator, thereby preventing the occurrence of an internal short circuit.

DETAILED DESCRIPTION OF THE INVENTION

Separators for nonaqueous electrolyte secondary batteries are required to have high puncture strength as described above. In particular, in the case of developing separators with a reduced thickness and increased porosity for the purpose of achieving batteries with high capacity and high power, an improvement in puncture strength is an important issue. The inventor has performed intensive investigations to solve this issue and, as a result, has found that a separator with at least a three-layer structure consisting of an A-layer, a B-layer, and a C-layer has specifically increased puncture strength when the average thermal expansion coefficient of each of the A-layer and the C-layer at a temperature of 0° C. to 50° C. is 100 ppm/K or more less than the average thermal expansion coefficient of the B-layer. In this case, the A-layer and the C-layer, which are placed on both outer surfaces of the B-layer, are bent due to the difference in average thermal expansion coefficient from the B-layer, which is an intermediate layer. This probably contributes to an increase in puncture strength.

A separator having a multilayer structure including an A-layer, a B-layer, and a C-layer is prepared in such a manner that films for forming these layers are lapped and are laminated, followed by stretching the laminated films in a heated state. In this operation, the A-layer and the C-layer are probably bent. That is, when the inequality (the average thermal expansion coefficient of the B-layer)−(the average thermal expansion coefficient of each of the A-layer and the C-layer)≥100 ppm/K holds, a large compressive stress is generated between the B-layer and each of the A-layer and the C-layer in the course of cooling subsequent to heating stretching. Even if the A-layer and the C-layer are bent or are slightly bent by the compressive stress, the A-layer and the C-layer do not fall into a strongly stretched state.

When the A-layer and the C-layer, which are placed on both outer surfaces of the B-layer, are in a strongly stretched state, cracks are likely to be caused in the A-layer and the C-layer by the impingement of contaminants or the like and it is conceivable that the separator is fractured through the cracks. However, in a separator for nonaqueous electrolyte secondary batteries according to the present disclosure, cracks are unlikely to be caused in an A-layer and a C-layer. This probably provides high puncture strength.

Embodiments of the present disclosure will now be described in detail with reference to the attached drawings.

Figure 1:
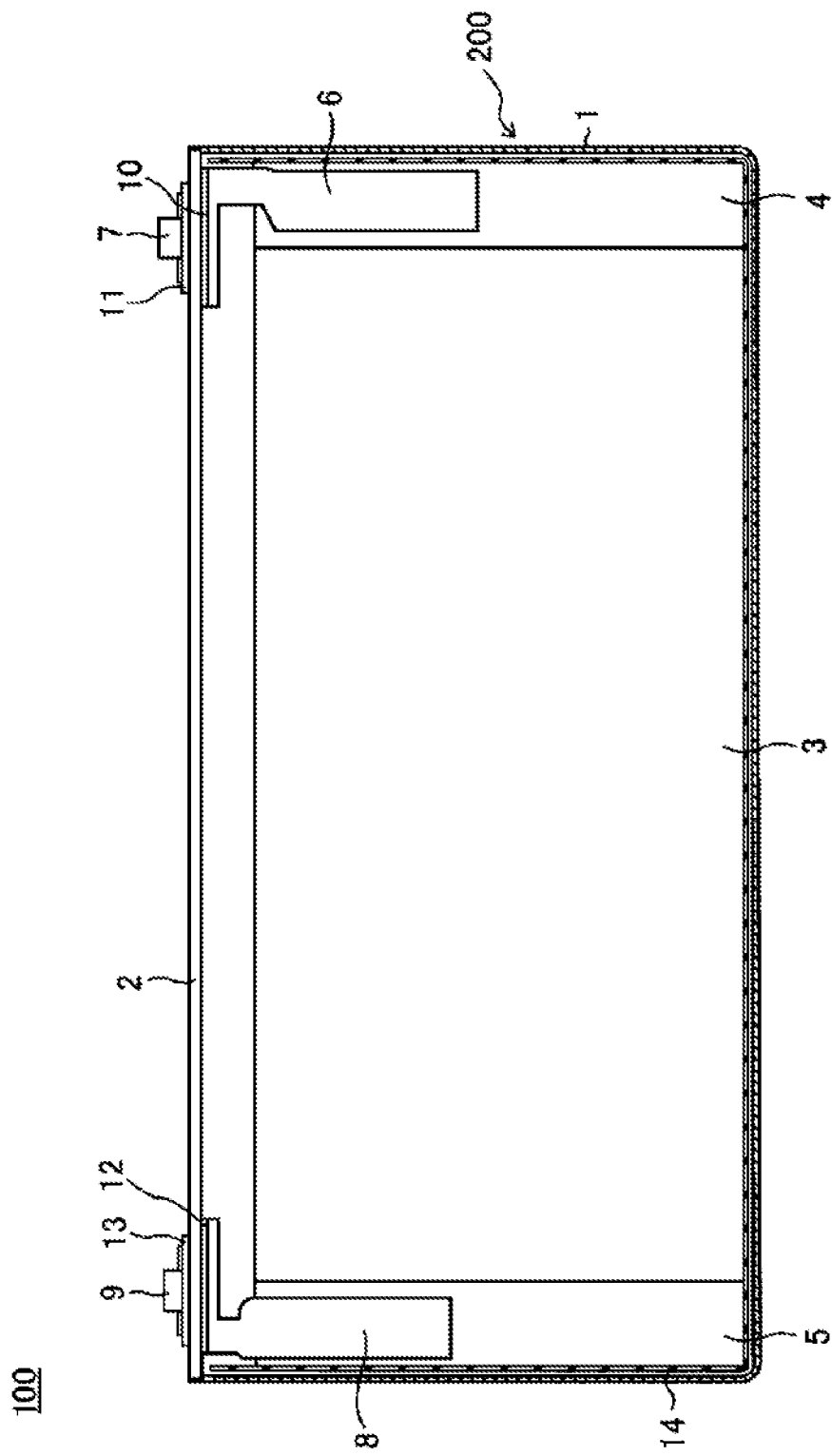
FIG. 1 is a sectional view of a nonaqueous electrolyte secondary battery according to an embodiment of the present disclosure.
Figure 2:
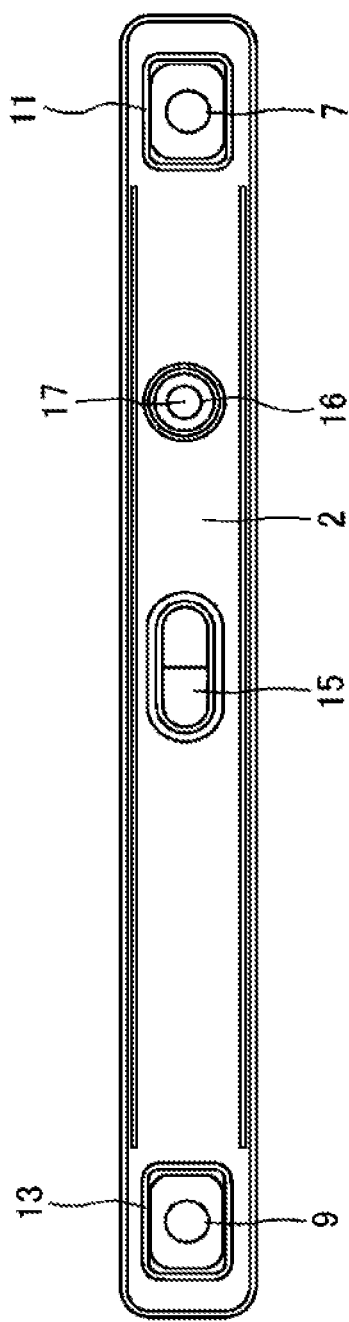
FIG. 2 is a plan view of the nonaqueous electrolyte secondary battery shown in FIG. 1.

FIGS. 1 and 2 show a nonaqueous electrolyte secondary battery 100 according to an embodiment of the present disclosure. The nonaqueous electrolyte secondary battery 100 is a prismatic battery and includes a prismatic battery case 200. The shape of the nonaqueous electrolyte secondary battery 100 is not particularly limited. The nonaqueous electrolyte secondary battery 100 may be a cylindrical battery including a cylindrical metal case, a coin-type battery including a coin-type metal case, or the like. In FIG. 1, a wound electrode assembly 3 is exemplified. A stacked electrode assembly in which multiple positive electrodes and multiple negative electrodes are alternately stacked with separators therebetween may be used.

As shown in FIGS. 1 and 2, the nonaqueous electrolyte secondary battery 100 includes a prismatic enclosure 1 which has an opening and which has a bottomed cylindrical shape and also includes a sealing plate 2 for sealing the opening of the enclosure 1. The enclosure 1 and the sealing plate 2 form the battery case 200. The enclosure 1 houses the electrode assembly 3, which is flat, and a nonaqueous electrolyte solution. The electrode assembly 3 includes a positive core-exposed portion 4 wound around one end portion thereof and a negative core-exposed portion 5 wound around the other end portion.

The positive core-exposed portion 4 is connected to a positive electrode current collector 6. The positive electrode current collector 6 is electrically connected to a positive electrode terminal 7. An inner insulating member 10 is placed between the positive electrode current collector 6 and the sealing plate 2. An outer insulating member 11 is placed between the positive electrode terminal 7 and the sealing plate 2.

The negative core-exposed portion 5 is connected to a negative electrode current collector 8. The negative electrode current collector 8 is electrically connected to a negative electrode terminal 9. An inner insulating member 12 is placed between the negative electrode current collector 8 and the sealing plate 2. An outer insulating member 13 is placed between the negative electrode terminal 9 and the sealing plate 2.

An insulating sheet 14 is placed between the electrode assembly 3 and the enclosure 1. The sealing plate 2 is provided with a gas release valve 15 that ruptures to release gas in the battery case 200 out of the battery case 200 when the pressure in the battery case 200 reaches a value greater than or equal to a predetermined value. Furthermore, the sealing plate 2 is provided with an electrolyte solution-pouring hole 16. The electrolyte solution-pouring hole 16 is sealed with a sealing plug 17 after the nonaqueous electrolyte solution is poured into the enclosure 1.

Figure 3:
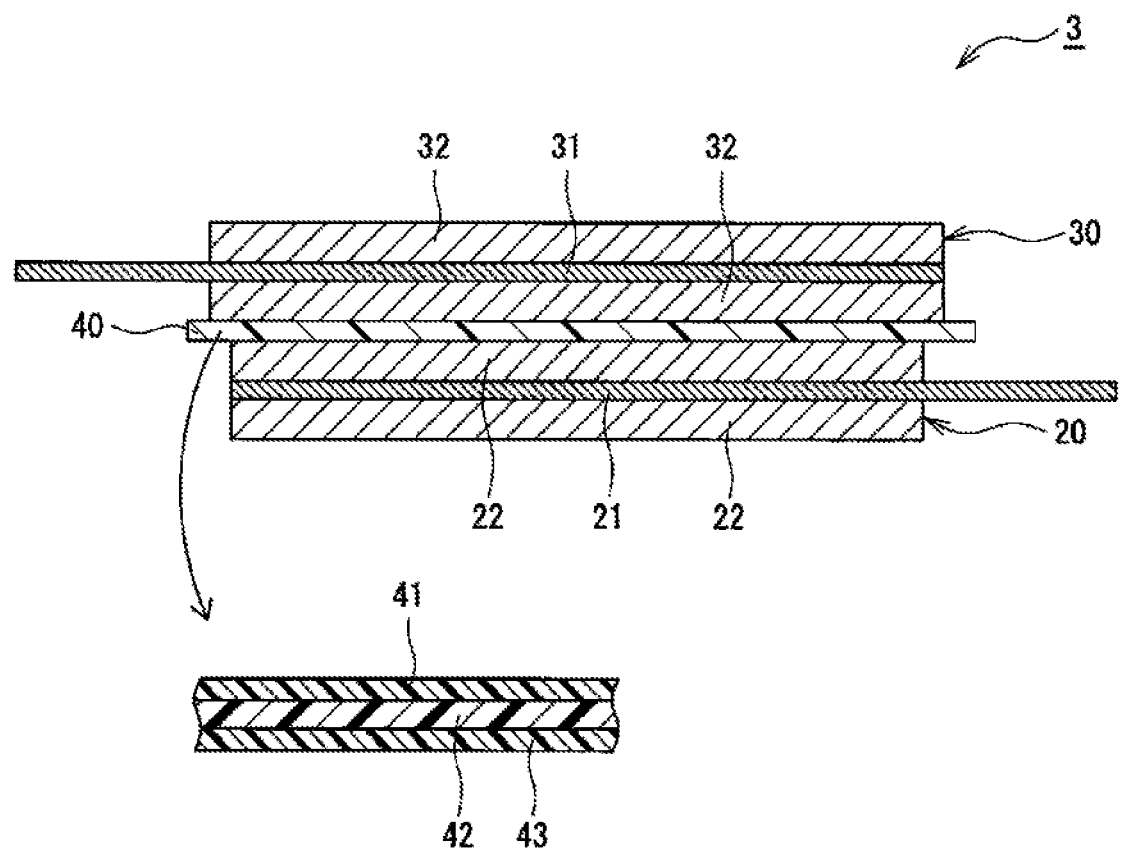
FIG. 3 is a partial sectional view of an electrode assembly included in the nonaqueous electrolyte secondary battery shown in FIG. 1.

The electrode assembly 3 and the nonaqueous electrolyte, which are included in the nonaqueous electrolyte secondary battery 100, are described below in detail with reference to FIG. 3. FIG. 3 is a partial sectional view of the electrode assembly 3 and shows a stack of a positive electrode 20, a separator 40, and a negative electrode 30.

As shown in FIG. 3, the electrode assembly 3 includes the positive electrode 20, the negative electrode 30, and the separator 40. The separator 40 is located between the positive electrode 20 and the negative electrode 30 to prevent the electrical contact therebetween. The positive electrode 20 includes a positive core 21 and positive electrode mix layers 22 formed on both surfaces of the positive core 21. Likewise, the negative electrode 30 includes a negative core 31 and negative electrode mix layers 32 formed on both surfaces of the negative core 31. In order to suppress the precipitation of lithium, the negative electrode 30 has a size slightly larger than that of the positive electrode 20. Each negative electrode mix layer 32 is placed in a range larger than regions of the negative electrode 30 that face the positive electrode mix layers 22 with the separator 40 therebetween.

Positive Electrode

The positive electrode 20 includes the positive core 21 and the positive electrode mix layers 22 as described above. The positive core 21 used may be foil of a metal, such as aluminium, stable within the potential range of the positive electrode 20, a film including a surface layer made of the metal, or the like. The positive electrode mix layers 22 contain a positive electrode active material, a conductive material, and a binding agent. The positive electrode 20 can be prepared in such a manner that, for example, positive electrode mix slurry containing the positive electrode active material, the conductive material, the binding agent, and the like is applied to both surfaces of the positive core 21 and coating films thereby formed are dried and are then rolled such that the positive electrode mix layers 22 are formed on both surfaces of the positive core 21.

A lithium-metal composite oxide containing a metal element such as Co, Mn, Ni, or Al can be exemplified as the positive electrode active material. Examples of the lithium composite oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$, where M is at least one selected from the group consisting of Na, Mg, Sc, Y, Mn, Fe, Co, Ni, Cu, Zn, Al, Cr, Pb, Sb, and B; $0.95 \leq x \leq 1.2$; $0.8 < y \leq 0.95$; and $2.0 \leq z \leq 2.3$. These oxides may be used alone or in combination.

When the positive electrode active material used is the lithium-metal composite oxide the packing density of the positive electrode mix layers 22 is preferably 2.5 g/cc to 4.2 g/cc and more preferably 2.8 g/cc or more. The positive electrode active material preferably accounts for 70% by volume or more of the positive electrode mix layers 22. In general, increasing the capacity of a battery increases the packing density of a positive electrode mix layer and also increases the volume of a positive electrode active material in the positive electrode mix layer. However, increasing the packing density of the positive electrode mix layers 22 and increasing the volume of the positive electrode active material in the positive electrode mix layers 22 harden the positive electrode mix layers 22. Therefore, in the case where, for example, a contaminant comes between the positive electrode 20 and the separator 40, the contaminant is likely to penetrate the separator 40. The separator 40 exhibits a remarkable effect in such a state that the separator 40 is combined with the positive electrode 20 including the hard positive electrode mix layers 22 as described in detail below.

The conductive material, which is contained in the positive electrode mix layers 22, may be a carbon material such as carbon black acetylene black, Ketjenblack, or graphite. The following resins can be exemplified as the binding agent: fluorinated resins such as polytetrafluoroethylene (PTFE) and polyvinylidene fluoride (PVdF) polyactylonitrile (PAN), polyimide resins, acrylic resins, and polyolefin resins. These resins may be used in combination with carboxymethylcellulose (CMC), a salt of CMC, polyethylene oxide (PEO), or the like. These may be used alone or in combination.

Negative Electrode

The negative electrode 30 includes the negative core 31 and the negative electrode mix layers 32 as described above. The negative core 31 used may be foil of a metal, such as copper, stable within the potential range of the negative electrode 30, a film including a surface layer made of the metal, or the like. The negative electrode mix layers 32 contain a negative electrode active material and a binding agent. The negative electrode 30 can be prepared in such a manner that, for example, negative electrode mix slurry containing the positive electrode active material, the binding agent, and the like is applied to both surfaces of the negative core 31 and coating films thereby formed are dried and are then rolled such that the negative electrode mix layers 32 are formed on both surfaces of the negative core 31.

The negative electrode active material is not particularly limited and may be one capable of reversibly intercalating and deintercalating lithium ions. The negative electrode active material used may be, for example, a carbon material such as natural graphite or synthetic graphite; a metal, such as silicon (Si) or tin (Sn), alloying with Li; an alloy containing a metal element such as Si or Sn; lithium titanate; or the like. The negative electrode active material may be used alone or in combination with another negative electrode active material. When the negative electrode active material used is a low-conductivity material such as lithium titanate, a conductive material such as carbon black is preferably added to the negative electrode mix layers 32. When the negative electrode active material used is the carbon material, the packing density of the negative electrode mix layers 32 is, for example, 1.5 g/cc to 2.5 g/cc.

As is the case with the positive electrode 20, the binding agent contained in the negative electrode mix layers 32 may be a fluorinated resin, PAN, a polyimide, an acrylic resin, a polyolefin, the like. In the case of preparing the negative electrode mix slurry using an aqueous solvent, it is preferable to use CMC, a salt of CMC, styrene-butadiene rubber (SBR), polyacrylic acid (PAA), a salt of PAA, polyvinyl alcohol, or the like. These may be used alone or in combination.

Separator

The separator 40 has ionic permeability and insulating properties, ensures the conductivity of lithium ions between the positive electrode 20 and the negative electrode 30, and separates the positive electrode 20 and the negative electrode 30 from each other. The separator 40 includes a porous resin sheet with at least a three-layer structure consisting of an A-layer 41, a B-layer 42, and a C-layer 43 stacked in that order. The separator 40 may include another layer. For example, an inorganic compound-containing layer may be present on a surface of at least one of the A-layer 41 and the B-layer 42. An example of the inorganic compound-containing layer is a porous layer, generally called a ceramic layer, containing an oxide, carbide, nitride, boride or phosphate containing titanium, aluminium silicon, or magnesium. The inorganic compound-containing layer preferably contains particles of an inorganic compound and a binder. Alternatively, a porous layer made of a resin, such as an aramid resin, having high heat resistance may be used instead of the inorganic compound-containing layer.

The porosity of the separator 40 is not particularly limited and is preferably 40% to 60% from the viewpoint of the increase in power of a battery. The thickness of the separator 40 is not particularly limited. From the viewpoint of the increase in capacity of a battery, the thickness of the separator 40 is preferably 7 µm to 40 µm and more preferably 10 µm to 30 µm. The thickness of each of the A-layer 41 and the C-layer 43 is, for example, 1 µm to 10 µm. The thickness of the B-layer 42 is, for example, 5 µm to 15 µm.

In the separator 40, the average thermal expansion coefficient of each of the A-layer 41 and the C-layer 43 at a temperature of 0° C. to 50° C. is 100 ppm/K or more less than the average thermal expansion coefficient of the B-layer 43. In other words, the average thermal expansion coefficient of the B-layer 43 is 100 ppm/K or more greater than the average thermal expansion coefficient of each of the A-layer 41 and the C-layer 43. In the case, where this condition is satisfied, the puncture strength of the separator 40 is specifically high. As batteries have higher capacity and higher power, separators are required to have a smaller thickness and higher porosity. According to the separator 40, high puncture strength can be ensured and a reduction in thickness and an increase in porosity can be achieved.

The average of the thermal expansion coefficient of the A-layer 41, the B-layer 42, or the C-layer 43 at a temperature of 0° C. to 50° C. is hereinafter referred to as the "average thermal expansion coefficient $\alpha_A$, $\alpha_B$, or $\alpha_C$", respectively. The average thermal expansion coefficient $\alpha_A$, $\alpha_B$, or $\alpha_C$ is measured using a thermomechanical analyzer (TMA) as described below. In an example below, the average thermal expansion coefficient $\alpha_A$ or $\alpha_B$ is measured in such a state that a film for forming the A-layer 41 or the B-layer 42, respectively, is unstretched and is monolayer. Even in the case where each layer is separated from the separator 40 and is measured, a similar value is obtained.

The separator 40 is prepared in such a manner that films for forming the A-layer 41, the B-layer 42, and the C-layer 43 are lapped and are laminated and the laminated films are stretched while being heated as described above. In a step of preparing the separator 40, particularly in the course of cooling subsequent to heating stretching, a large compression stress acts between the B-layer 42 and each of the A-layer 41 and the C-layer 43 to bend the A-layer 41 and the C-layer 43. At least one of the A-layer 41 and the C-layer 43 does not fall into such a strongly stretched state that cracks are likely to be caused. Therefore, it is conceivable that high puncture strength is obtained.

The difference ((the average thermal expansion coefficient $\alpha_B$)−(each of the average thermal expansion coefficients $\alpha_A$ and $\alpha_C$)) between the average thermal expansion coefficient $\alpha_B$ and each of the average thermal expansion coefficients $\alpha_A$ and $\alpha_C$ is at least 100 ppm/K and is preferably large and the upper limit thereof is not particularly limited from the viewpoint of the increase in puncture strength. A preferable example of the difference between the average thermal expansion coefficient $\alpha_B$ and each of the average thermal expansion coefficients $\alpha_A$ and $\alpha_C$ is 100 ppm/K to 200 ppm/K.

The A-layer 41 and the C-layer 43 may be such porous layers that the average thermal expansion coefficients $\alpha_A$ and $\alpha_C$ are 100 ppm/K or more less than the average thermal expansion coefficient $\alpha_B$. The average thermal expansion coefficients $\alpha_A$ and $\alpha_C$ are preferably close or equal to each other. The difference between the average thermal expansion coefficients $\alpha_A$ and $\alpha_C$ is preferably 20 ppm/K or less, is more preferably 10 ppm/K or less, and may be substantially 0 ppm/K. When the difference between the average thermal expansion coefficients $\alpha_A$ and $\alpha_C$ is 20 ppm/K or less, both surfaces of the separator 40 have substantially the same puncture strength; hence, stable performance is likely to be ensured.

The A-layer 41 and the C-layer 43 are porous layers sandwiching the B-layer 42. When the separator 40 is composed of these three layers, the A-layer 41 and the C-layer 43 are surface layers and the B-layer 42 is an intermediate layer. The A-layer 41 and the C-layer 43 may have the same configuration. In this case, the difference between the average thermal expansion coefficients $\alpha_A$ and $\alpha_C$ is substantially 0 ppm/K, and the separator 40 has an A-layer 41/B-layer 42/A-layer 41 multilayer structure. Alternatively, the A-layer 41 and the C-layer 43 may have different configurations. The A-layer 41 and the C-layer 43 may be made of different types of resins. Alternatively, the A-layer 41 and the C-layer 43 may be different in molecular weight or density from each other, although the A-layer 41 and the C-layer 43 are made of the same type of resin.

The following materials can be exemplified as a resin making up the A-layer 41 and the C-layer 43: polyolefins such as polyethylene, polypropylene, polybutene, and ethylene-propylene copolymers; fluororesins such as polyvinylidene fluoride and polytetrafluoroethylene; fluorine-containing rubbers such as vinylidene fluoride-hexafluoropropylene-tetrafluoroethylene copolymers and ethylene-tetrafluoroethylene copolymers; aromatic polyamides; wholly aromatic polyamides (aramid resins); styrene-butadiene copolymers; hydrogenated styrene-butadiene copolymers; methacrylate copolymers; acrylonitrile-acrylate copolymers; styrene-acrylate copolymers; rubbers such as ethylene-propylene rubber and polyvinyl acetate; resins, such as polyphenylene ether, polysulfone polyethersulfone, polyphenylene sulfide, polyetherimide, polyamide-imide, polyetheramide, and polyester, having a melting point or glass transition temperature of 180° C. or more; and water-soluble polymers such as polyvinyl alcohol, polyethylene glycol, cellulose ether, sodium alginate, polyacrylic acid, polyacrylamide, and polymethacrylic acid.

A resin making up the B-layer 42 satisfies the above conditions for the average thermal expansion coefficients $\alpha_A$, $\alpha_B$, and $\alpha_C$ and may be the same as the resin making up the A-layer 41 and the C-layer 43. A preferable example of the B-layer 42 is a porous layer containing a major component that is ultra-high molecular weight polyethylene with a weight-average molecular weight of $1 \times 10^6$ to $7 \times 10^6$. The term "major component" as used herein refers to a component having the maximum weight among components of the B-layer 42. The B-layer 42 may contain a resin other than ultra-high molecular weight polyethylene and may be substantially made of ultra-high molecular weight polyethylene only. Forming the B-layer 42 using the ultra-high molecular weight polyethylene with a weight-average molecular weight of $1 \times 10^6$ to $7 \times 10^6$ allows the average thermal expansion coefficient $\alpha_B$ to be high.

Another preferable example of the B-layer 42 is a porous layer which contains a major component that is polyethylene and which has a density of 0.93 g/cc or less at a porosity of 0%. Herein, the density at a porosity of 0% is determined by multiplying, for example, the actual density of the B-layer 42 by 100/(100−X) 100/X, X is the porosity of the separator 40 (the B-layer 42) in percent. Setting the density of the B-layer 42 at a porosity of 0% (hereinafter simply referred to as the density) to 0.93 g/cc or less allows the average thermal expansion coefficient $\alpha_B$ to be high. In an example below, a film for forming each of the A-layer 41 and the B-layer 42 is measured for density. Even in the case where the B-layer 42 is separated from the separator 40 and is measured, a similar value is obtained.

The density of the B-layer 42 may be, for example, 0.88 g/cc to 0.95 g/cc. When the B-layer 42 is made of ultra-high molecular weight polyethylene, the average thermal expansion coefficient $\alpha_B$ can be maintained sufficiently high even if the density thereof exceeds 0.93 g/cc. When the B-layer 42 is made of polyethylene with weight-average molecular weight of less than $1 \times 10^6$, the density of the B-layer 42 is preferably adjusted to 0.93 g/cc or less. The B-layer 42 is preferably a porous layer which is made of ultra-high molecular weight polyethylene and which has a density of 0.93 g/cc or less. Even if the same type of resin is used to prepare a film for forming the B-layer 42, the density of the B-layer 42 can be adjusted in such a manner that the crystallinity of the resin is controlled by varying the cooling rate of the film during the preparation of the film.

The A-layer 41, the B-layer 42, and the C-layer 43 may contain filler such as an inorganic compound. In particular, allowing the A-layer 41 and the C-layer 43 to contain the filler enables the average thermal expansion coefficients $\alpha_A$ and $\alpha_C$ to be reduced and enables the difference between the average thermal expansion coefficient $\alpha_B$ and each of the average thermal expansion coefficients $\alpha_A$ and $\alpha_C$ to be increased.

In the electrode assembly 3, the fracture strength of the separator 40 is preferably 30 N/mm$^2$ or more as measured by a copper ball punch penetration test. The copper ball punch penetration test is carried out in such a manner that the electrode assembly 3 is pressed in such a state that copper balls are interposed between the positive electrode 20 and the separator 40 as described below. The positive electrode 20 is harder than the negative electrode 30. Therefore, the separator 40 preferably has a fracture strength of 30 N/mm$^2$ or more as measured by a penetration test using copper balls interposed between the positive electrode 20 and the separator 40.

Nonaqueous Electrolyte

The nonaqueous electrolyte contains a nonaqueous solvent and an electrolyte salt dissolved in the nonaqueous solvent. Examples of the nonaqueous solvent include esters such as cyclic carbonates including ethylene carbonate and propylene carbonate and linear carbonates including dimethyl carbonate, methyl ethyl carbonate, and diethyl carbonate; ethers such as 1,3-dioxolane; nitriles such as acetonitrile; amides such as dimethylformamide; and mixtures of two or more of these solvents. The nonaqueous solvent may contain a halogen-substituted compound, such as fluoroethylene carbonate or methyl fluoro propionate, obtained by substituting a hydrogen atom in at least one of these solvents with a halogen atom such as a fluorine atom. The electrolyte salt used is, for example, a lithium salt such as $LiBF_4$ or $LiPF_6$. The electrolyte salt is not limited to any liquid electrolyte (nonaqueous electrolyte solution) and may be a solid electrolyte containing a gel-like polymer.

EXAMPLES

The present disclosure is further described below in detail with reference to examples. The present disclosure is not limited to the examples.

Example 1

Preparation of Positive Electrode

Lithium cobaltate ($LiCoO_2$), acetylene black, and polyvinylidene fluoride (PVdF) were mixed at a mass ratio of 94:3:3, followed by adding an appropriate amount of N-methyl-2-pyrrolidone (NMP) to the mixture, whereby positive electrode mix slurry was prepared. Next, the positive electrode mix slurry was applied to both surfaces of a positive core, made of aluminium foil, having a thickness of 15 μm by a doctor blade method.

After coating films thereby formed were dried, the dry coating films (positive electrode mix layers) were compressed with a compression roller, whereby a positive electrode including the positive core and positive electrode mix layers formed on both surfaces of the positive core was prepared. The thickness of the positive electrode, which included the positive core, was 120 μm. The packing density of the positive electrode mix layers was 3.8 g/cc. A positive electrode active material accounted for 75% by volume of the positive electrode mix layers.

Preparation of Negative Electrode

Graphite, styrene-butadiene rubber (SBR), and sodium carboxymethylcellulose (CMC-Na) were mixed at a mass ratio of 95:3:2, followed by adding an appropriate amount of water to the mixture, whereby negative electrode mix slurry was prepared. Next, the negative electrode mix slurry was applied to both surfaces of a negative core, made of copper foil, having a thickness of 8 μm by a doctor blade method. After coating films thereby formed were dried, the dry coating films (negative electrode mix layers) were compressed with a compression roller, whereby a negative electrode including the negative core and negative electrode mix layers formed on both surfaces of the negative core was prepared. The thickness of the negative electrode, which included the negative core, was 140 μm. The packing density of the negative electrode mix layers was 1.5 g/cc.

Preparation of Separator

A separator having a three-layer structure consisting of an A-layer, a B-layer, and an A-layer was prepared. A film (hereinafter referred to as "Film A") for forming each A-layer was prepared using polypropylene with a weight-average molecular weight of $1 \times 10^6$. A film (hereinafter referred to as "Film B") for forming the B-layer was prepared using polyethylene with a weight-average molecular weight of $1 \times 10^6$. Film A had a thickness of 6 μm. The crystallinity of Film A was controlled by adjusting the cooling rate during film formation such that Film A had a density of 0.9 g/cc and an average thermal expansion coefficient $\alpha_A$ of 70 ppm/K at a temperature of 0° C. to 50° C. Film B had a thickness of 8 μm. The crystallinity of Film B was controlled by adjusting the cooling rate during film formation such that Film B had a density of 0.94 g/cc and an average thermal expansion coefficient $\alpha_A$ of 170 ppm/K at a temperature of 0° C. to 50° C.

Film A, Film B, and Film A were lapped in that order and were laminated using a heating roll, whereby a laminate film with a three-layer structure was obtained. The laminate film was uniaxially stretched (stretched in an MD direction) under such conditions that the laminate film had a porosity of 50%. The separator, which was obtained in this manner, was a porous resin sheet having an A-layer/B-layer/A-layer three-layer structure, a thickness of 20 μm, and a porosity of 50%.

A method for measuring the average thermal expansion coefficients $\alpha_A$ and $\alpha_B$ of Films A and B was as described below. The separator was subjected to a copper ball punch penetration test by a method below. The average thermal expansion coefficients $\alpha_A$ and $\alpha_B$ and results of the copper ball punch penetration test were shown in the table below.

Measurement of Average Thermal Expansion Coefficient

Films A and B were measured for average thermal expansion coefficient at a temperature of 0° C. to 50° C. in accordance with a procedure including Steps (1) to (4) below using a thermomechanical analyzer (TMA).

(1) Each of Films A and B was cut to a size of 1 cm to 2 cm, whereby a specimen was prepared.
(2) Chucks of the TMA were attached to both ends of the specimen, followed by applying a load of 1 gf to the specimen.
(3) The specimen was heated from −10° C. to 60° C. at a rate of 5° C./min.
(4) The average thermal expansion coefficient of the specimen at a temperature of 0° C. to 50° C. was calculated from the temperature and elongation of the specimen.

Copper Ball Punch Penetration Test

Figure 4:
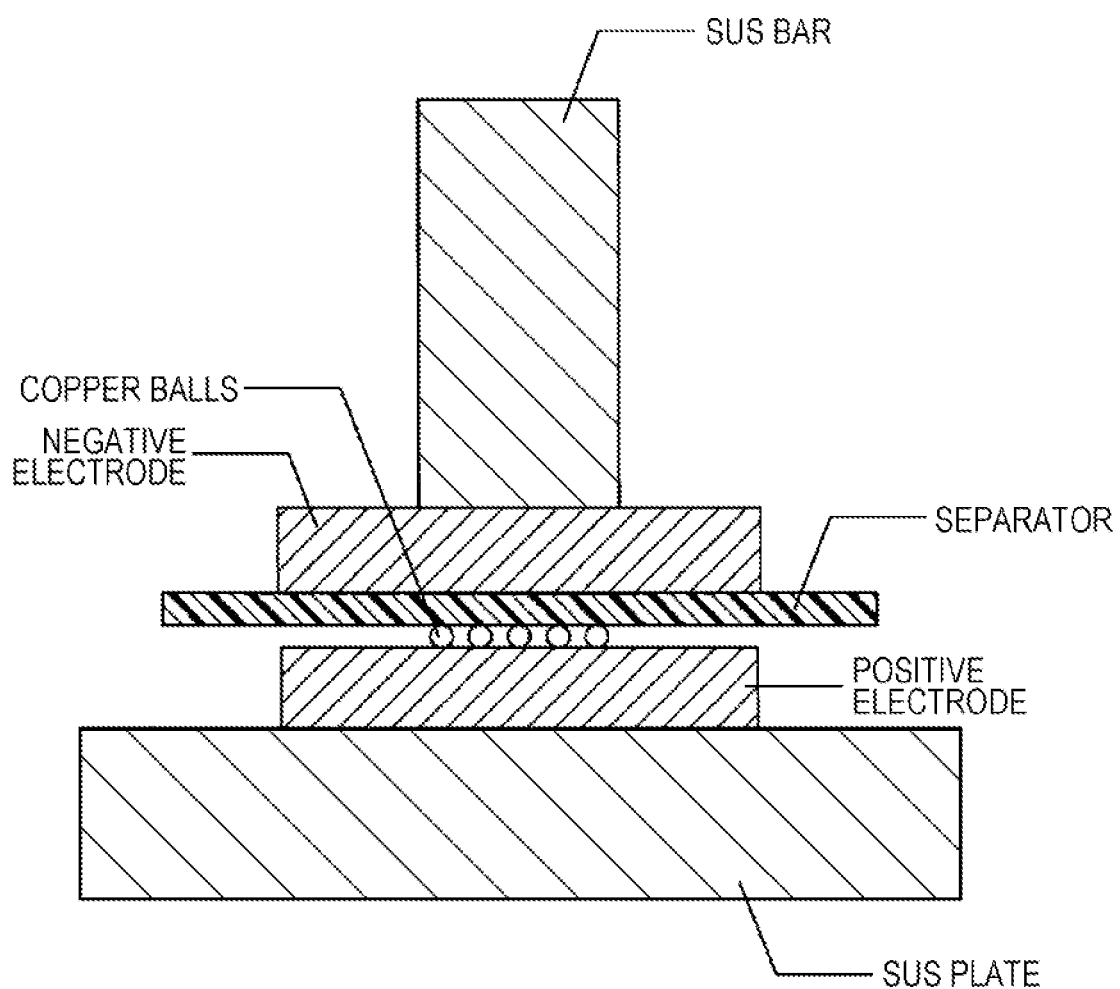
FIG. 4 is an illustration showing a method of a copper ball punch penetration test for a separator.

The separator, the positive electrode, the negative electrode, and copper balls were set as shown in FIG. 4, followed by carrying out the copper ball punch penetration test. As shown in FIG. 4, the positive electrode, the negative electrode, and the separator sandwiched therebetween were placed on a SUS plate. The copper balls had a diameter of 200 μm. The number of the copper balls interposed between the positive electrode and the negative electrode was 10. In this state, a stack (electrode assembly) of the positive electrode, the negative electrode, and the separator was pressed from the negative electrode side to the SUS plate using a SUS bar with a diameter of 6 mm. The SUS bar was perpendicular to a surface of the SUS plate. In the course of pressing, the resistance between the SUS plate and the SUS bar was monitored and the pressing force detected at the transition from an insulating state to a conducting state was determined as the fracture strength. Incidentally, the conducting state occurred when the copper balls penetrated the separator.

Examples 2 to 11 and Comparative Examples 1 to 5

Separators were prepared using Films A and B shown in the table, were measured for average thermal expansion coefficient in accordance with the above procedure, and were subjected to the copper ball punch penetration test by the above method. The density and average thermal expansion coefficient of each of Films A and B were adjusted by varying the cooling rate during film formation. Films A had a thickness of 6 μm and Films B had a thickness of 8 μm.

TABLE

| | $\alpha_B - \alpha_A$ (ppm/K) | Penetration strength (N/mm²) | B-layer (Film B) | | | A-layer (Film A) | | |
|---|---|---|---|---|---|---|---|---|
| | | | Molecular weight of polyethylene | Density (g/cc) | Average thermal expansion coefficient $\alpha_B$ (ppm/K) | Molecular weight of polypropylene | Density (g/cc) | Average thermal expansion coefficient $\alpha_A$ (ppm/K) |
| Example 1 | 100 | 31 | $1.0 \times 10^6$ | 0.94 | 170 | $1.0 \times 10^6$ | 0.90 | 70 |
| Example 2 | 110 | 32 | $3.0 \times 10^6$ | 0.94 | 180 | $1.0 \times 10^6$ | 0.90 | 70 |
| Example 3 | 120 | 36 | $5.5 \times 10^6$ | 0.94 | 190 | $1.0 \times 10^6$ | 0.90 | 70 |
| Example 4 | 130 | 40 | $6.0 \times 10^6$ | 0.94 | 200 | $1.0 \times 10^6$ | 0.90 | 70 |
| Example 5 | 100 | 30 | $3.0 \times 10^6$ | 0.94 | 180 | $1.0 \times 10^6$ | 0.88 | 80 |

TABLE-continued

|  | $\alpha_B - \alpha_A$ (ppm/K) | Penetration strength (N/mm²) | B-layer (Film B) | | | A-layer (Film A) | | |
|---|---|---|---|---|---|---|---|---|
|  |  |  | Molecular weight of polyethylene | Density (g/cc) | Average thermal expansion coefficient $\alpha_B$ (ppm/K) | Molecular weight of polypropylene | Density (g/cc) | Average thermal expansion coefficient $\alpha_A$ (ppm/K) |
| Example 6 | 110 | 32 | $5.5 \times 10^6$ | 0.94 | 190 | $1.0 \times 10^6$ | 0.88 | 80 |
| Example 7 | 120 | 35 | $6.0 \times 10^6$ | 0.94 | 200 | $1.0 \times 10^6$ | 0.88 | 80 |
| Comparative Example 1 | 90 | 27 | $0.7 \times 10^6$ | 0.94 | 160 | $1.0 \times 10^6$ | 0.90 | 70 |
| Comparative Example 2 | 80 | 25 | $0.5 \times 10^6$ | 0.94 | 150 | $1.0 \times 10^6$ | 0.90 | 70 |
| Comparative Example 3 | 90 | 25 | $1.0 \times 10^6$ | 0.94 | 170 | $1.0 \times 10^6$ | 0.88 | 80 |
| Example 8 | 120 | 36 | $0.5 \times 10^6$ | 0.90 | 190 | $1.0 \times 10^6$ | 0.90 | 70 |
| Example 9 | 110 | 32 | $0.5 \times 10^6$ | 0.91 | 180 | $1.0 \times 10^6$ | 0.90 | 70 |
| Example 10 | 100 | 31 | $0.5 \times 10^6$ | 0.92 | 170 | $1.0 \times 10^6$ | 0.90 | 70 |
| Example 11 | 100 | 32 | $0.5 \times 10^6$ | 0.93 | 170 | $1.0 \times 10^6$ | 0.90 | 70 |
| Comparative Example 4 | 80 | 25 | $0.5 \times 10^6$ | 0.94 | 150 | $1.0 \times 10^6$ | 0.90 | 70 |
| Comparative Example 5 | 50 | 22 | $0.5 \times 10^6$ | 0.95 | 120 | $1.0 \times 10^6$ | 0.90 | 70 |

As shown in the table, the separators prepared in the examples have higher penetration strength (puncture strength) as compared to the separator prepared in the comparative examples. That is, when the difference obtained by subtracting the average thermal explosion coefficient $\alpha_A$ from the average thermal expansion coefficient $\alpha_B$ is 100 ppm/K or more, the puncture strength is specifically high. In the case where ultra-high molecular weight polyethylene with a weight-average molecular weight of $1 \times 10^6$ or more was used to form a B-layer (Examples 1 to 7) and in the case where the density of a B-layer was 0.93 g/cc or less (Examples 8 to 11), good results were obtained.

In the examples, the A-layers were formed from polypropylene and the B-layers were formed from polyethylene. The difference obtained by subtracting the average thermal expansion coefficient $\alpha_A$ from the average thermal expansion coefficient $\alpha_B$ is an important factor for the increase of the puncture strength and is not significantly affected by the composition of resin in principle.

Incidentally, a major component of each of an A-layer, a B-layer, and a C-layer is preferably resin. Resin preferably accounts for, for example, 90% by volume or more of each of the A-layer, the B-layer, and the C-layer. A major component of each of the A-layer and the C-layer is preferably polypropylene and a major component of the B-layer is preferably polyethylene.

While detailed embodiments have been used to illustrate the present invention to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A separator for nonaqueous electrolyte secondary batteries, comprising a porous resin sheet having at least a three-layer structure consisting of an A-layer, a B-layer, and a C-layer stacked in that order, wherein the average thermal expansion coefficient of the A-layer at a temperature of 0° C. to 50° C. is 100 ppm/K or more lower than the average thermal expansion coefficient of the B-layer at a temperature of 0° C. to 50° C. so as to obtain a difference between the average thermal expansion coefficient of the A-layer and the average thermal expansion coefficient of the B-layer of 100 ppm/K or greater;

the average thermal expansion coefficient of the C-layer at a temperature of 0° C. to 50° C. is 100 ppm/K or more lower than the average thermal expansion coefficient of the B-layer at a temperature of 0° C. to 50° C. so as to obtain a difference between the average thermal expansion coefficient of the C-layer and the average thermal expansion coefficient of the B-layer of 100 ppm/K or greater;

wherein each of the A-layer, the B-layer, and the C-layer included in the three-layer structure of the porous resin sheet is formed of a film, and the adjacent layers directly adheres to each other;

wherein the difference between the average thermal expansion coefficient of the A-layer at a temperature of 0° C. to 50° C. and the average thermal expansion coefficient of the C-layer at a temperature of 0° C. to 50° C. is 20 ppm/K or less;

wherein the A-layer is formed of a material selected from the group consisting of polyolefins including polyethylene, polypropylene, polybutene, and ethylene-propylene copolymers; fluororesins including polyvinylidene fluoride and polytetrafluoroethylene; fluorine-containing rubbers including vinylidene fluoride-hexafluoropropylene-tetrafluoroethylene copolymers and ethylene-tetrafluoroethylene copolymers; aromatic polyamides; wholly aromatic polyamides; styrene-butadiene copolymers; hydrogenated styrene-butadiene copolymers; methacrylate copolymers; acrylonitrile-acrylate copolymers; styrene-acrylate copolymers; rubbers including ethylene-propylene rubber and polyvinyl acetate; resins, including polyphenylene ether, polysulfone, polyethersulfone, polyphenylene sulfide, polyetherimide, polyamideimide, polyetheramide, and polyester, having a melting point or glass transition temperature of 180° C. or more; and water-soluble polymers including polyvinyl alcohol, polyethylene glycol, cellulose ether, sodium alginate, polyacrylic acid, polyacrylamide, and polymethacrylic acid;

wherein the B-layer is formed of a material selected from the group consisting of polyolefins including polyethylene, polypropylene, polybutene, and ethylene-propylene copolymers; fluororesins including polyvinylidene fluoride and polytetrafluoroethylene; fluorine-containing rubbers including vinylidene fluoride-hexafluoropropylene-tetrafluoroethylene copolymers and ethylene-tetrafluoroethylene copolymers; aromatic polyamides; wholly aromatic polyamides; styrene-butadiene copolymers; hydrogenated styrene-butadiene copolymers; methacrylate copolymers; acrylonitrile-acrylate copolymers; styrene-acrylate copolymers; rubbers including ethylene-propylene rubber and polyvinyl acetate; resins, including polyphenylene ether, polysulfone, polyethersulfone, polyphenylene sulfide, polyetherimide, polyamideimide, polyetheramide, and polyester, having a melting point or glass transition temperature of 180° C. or more; and water-soluble polymers including polyvinyl alcohol, polyethylene glycol, cellulose ether, sodium alginate, polyacrylic acid, polyacrylamide, and polymethacrylic acid; and wherein the C-layer is formed of a material selected from the group consisting of polyolefins including polyethylene, polypropylene, polybutene, and ethylene-propylene copolymers; fluororesins including polyvinylidene fluoride and polytetrafluoroethylene; fluorine-containing rubbers including vinylidene fluoride-hexafluoropropylene-tetrafluoroethylene copolymers and ethylene-tetrafluoroethylene copolymers; aromatic polyamides; wholly aromatic polyamides; styrene-butadiene copolymers; hydrogenated styrene-butadiene copolymers; methacrylate copolymers; acrylonitrile-acrylate copolymers; styrene-acrylate copolymers; rubbers including ethylene-propylene rubber and polyvinyl acetate; resins, including polyphenylene ether, polysulfone, polyethersulfone, polyphenylene sulfide, polyetherimide, polyamideimide, polyetheramide, and polyester, having a melting point or glass transition temperature of 180° C. or more; and water-soluble polymers including polyvinyl alcohol, polyethylene glycol, cellulose ether, sodium alginate, polyacrylic acid, polyacrylamide, and polymethacrylic acid.

2. The separator according to claim 1, wherein the B-layer is a porous layer containing a major component that is polyethylene with a weight-average molecular weight of $1\times10^6$ to $7\times10^6$.

3. The separator according to claim 1, wherein the B-layer is a porous layer containing a major component that is polyethylene and has a density of 0.93 g/cc or less at a porosity of 0%.

4. A nonaqueous electrolyte secondary battery comprising:
an electrode assembly including a positive electrode, a negative electrode, and the separator according to claim 1; and
a nonaqueous electrolyte.

5. The nonaqueous electrolyte secondary battery according to claim 4, wherein in the electrode assembly, the fracture strength of the separator is 30 N/mm$^2$ or more as measured by a copper ball punch penetration test.

6. The separator according to claim 1, wherein the separator has a fracture strength as measured by a copper ball punch penetration test in a range of about 30 N/mm$^2$ to about 40 N/mm$^2$.

* * * * *